June 21, 1955 J. H. HAMMOND, JR., ET AL 2,711,441
TELEVISION STILL PICTURE TRANSMITTER
Filed Dec. 6, 1950 5 Sheets-Sheet 1

Inventors
JOHN HAYS HAMMOND, JR.
By ELLISON S. PURINGTON.
Attorney

June 21, 1955 J. H. HAMMOND, JR., ET AL 2,711,441

TELEVISION STILL PICTURE TRANSMITTER

Filed Dec. 6, 1950 5 Sheets-Sheet 2

Inventors
JOHN HAYS HAMMOND, JR.
ELLISON S. PURINGTON.

By [signature]
Attorney

June 21, 1955 J. H. HAMMOND, JR., ET AL 2,711,441

TELEVISION STILL PICTURE TRANSMITTER

Filed Dec. 6, 1950 5 Sheets-Sheet 3

Inventors
JOHN HAYS HAMMOND, JR.
ELLISON S. PURINGTON.
By
Attorney

June 21, 1955 J. H. HAMMOND, JR., ET AL 2,711,441

TELEVISION STILL PICTURE TRANSMITTER

Filed Dec. 6, 1950 5 Sheets-Sheet 4

Inventors

JOHN HAYS HAMMOND, JR.

ELLISON S. PURINGTON.

By

Attorney

TELEVISION STILL PICTURE TRANSMITTER

Filed Dec. 6, 1950 5 Sheets-Sheet 5

Inventors
JOHN HAYS HAMMOND, JR.
ELLISON S. PURINGTON.
By [signature]
Attorney 2,711,441

TELEVISION STILL PICTURE TRANSMITTER

John Hays Hammond, Jr., and Ellison S. Purington, Gloucester, Mass.; said Purington assignor to said Hammond, Jr.

Application December 6, 1950, Serial No. 199,533

6 Claims. (Cl. 178—7.1)

This invention relates to a transmitter system for inserting a plurality of still pictures into the video channel of a standard television transmitter, for purposes of recording by a suitably correlated receiver system.

In co-pending application of E. S. Purington, Ser. 152,174 filed March 27, 1950, means has been shown for sending a single picture in such a manner, with the receiver recorder operated by a control signal also on the video channel. One of the objects of the present invention is to provide a precise timing arrangement whereby a single control signal suffices to coordinate the sending and receiving of a number of pictures in a brief interval of time.

The invention also consists in certain new and original features of construction and combinations of parts hereinafter set forth and claimed.

The nature of the invention as to its objects and advantages, the mode of its operation and the manner of its organization, may be better understood by referring to the following description, taken in connection with the accompanying drawings forming a part thereof, in which Fig. 1 is a schematic diagram of the transmitter system;

Like reference characters denote like parts in the several figures of the drawing.

In the following description parts will be identified by specific names for convenience, but they are intended to be generic in their application to similar parts.

Figure 1:
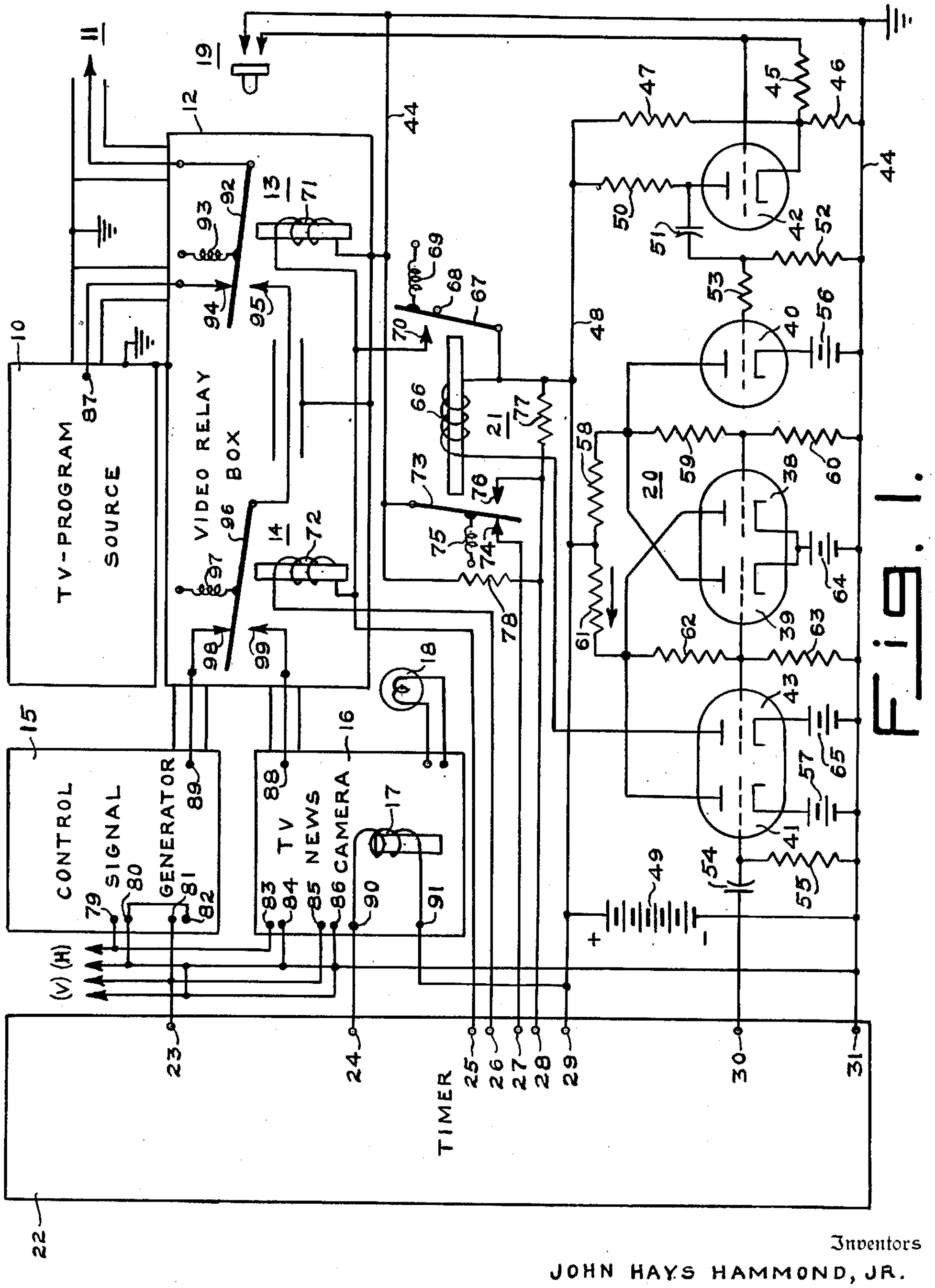

With especial reference to Fig. 1, the television material for usual entertainment purposes originates in the TV-program source 10, which symbolizes the pick-up cameras, switching gear and other essential equipment. Normally this is connected by a transmission line 11 to the video circuit of a television transmitter, not shown. The output connection of the source 10 and the line 11 are both connected to a video relay box 12 which contains a program break relay 13 and a shift relay 14. These are high speed low capacitance relays, the positions of the armatures of which determine whether the video transmitter line 11 is connected to the normal source 10, or to a control signal generator 15, or to a television news camera 16.

The generator 15 produces a characteristic signal in the video frequency range, but sufficiently different from video signals normally originating in source 10 or in the news camera 16. For example the output of the control signal generator may comprise a wave which is shifted in frequency between the eighth and ninth harmonic of the horizontal sweep frequency of the system, at a rate corresponding to the eighth harmonic of the vertical sweep frequency.

The TV news camera source 16 provides for transmission of a plurality of still pictures, which may be prerecorded on film or slides. It includes an advancing solenoid or other electromagnetic device 17 by which the film or slide may be advanced so that the camera will scan the plurality of still pictures in succession. This camera may include a switch or push button for operating a ready light 18 to indicate that material has been set up in place and that everything is in readiness for transmission of the prepared still pictures.

An operational push button 19 is provided for manual initiation of the functioning of the relays 13, 14, and the advancing solenoid 17. Upon depressing this button, an electronic toggle 20 is operated to close a relay 21, the right contacts of which actuate the program break relay 13 to disconnect the line 11 from the program source 10, and connect it to the armature of the shift relay 14 and the output of the generator 15. The left contacts of relay 21 function to start the operation of a timer 22 shown in block, with terminals 23 to 31 inclusive, corresponding to similarly numbered terminals in Fig. 2 to which they are respectively connected. The starting of the timer is accomplished when the relay 21 operates to disconnect terminal 27 from ground, and to connect terminal 28 to ground. Shortly thereafter the timer operates to connect the terminal 26 to ground, to cause operation of the shift relay 14, to disconnect the generator 15 from the line 11 and to connect the TV news camera 16. At appropriate times thereafter, the timer grounds the terminal 24 to cause successive advances of the solenoid 17 to present the various still pictures in turn. Finally at the end of the last picture transmission, the timer impresses a positive electrical pulse with respect to ground terminal 31 on terminal 30, which resets the toggle 20 to de-energize the relay 21. This restores the relays 13 and 14 to the normal position shown, restores the normal connection from the program source 10 to line 11, and resets the timer mechanism for proper operation upon the next closure of the button 19. It will be understood that because of the nature of the toggle circuit, the operation of the toggle is affected only by closure of the button 19. The button 19 may be released at any time after it has started the timing operation. That is, it can be released either while the relays 21 and 13 are closed, or at any subsequent time.

Figure 3:
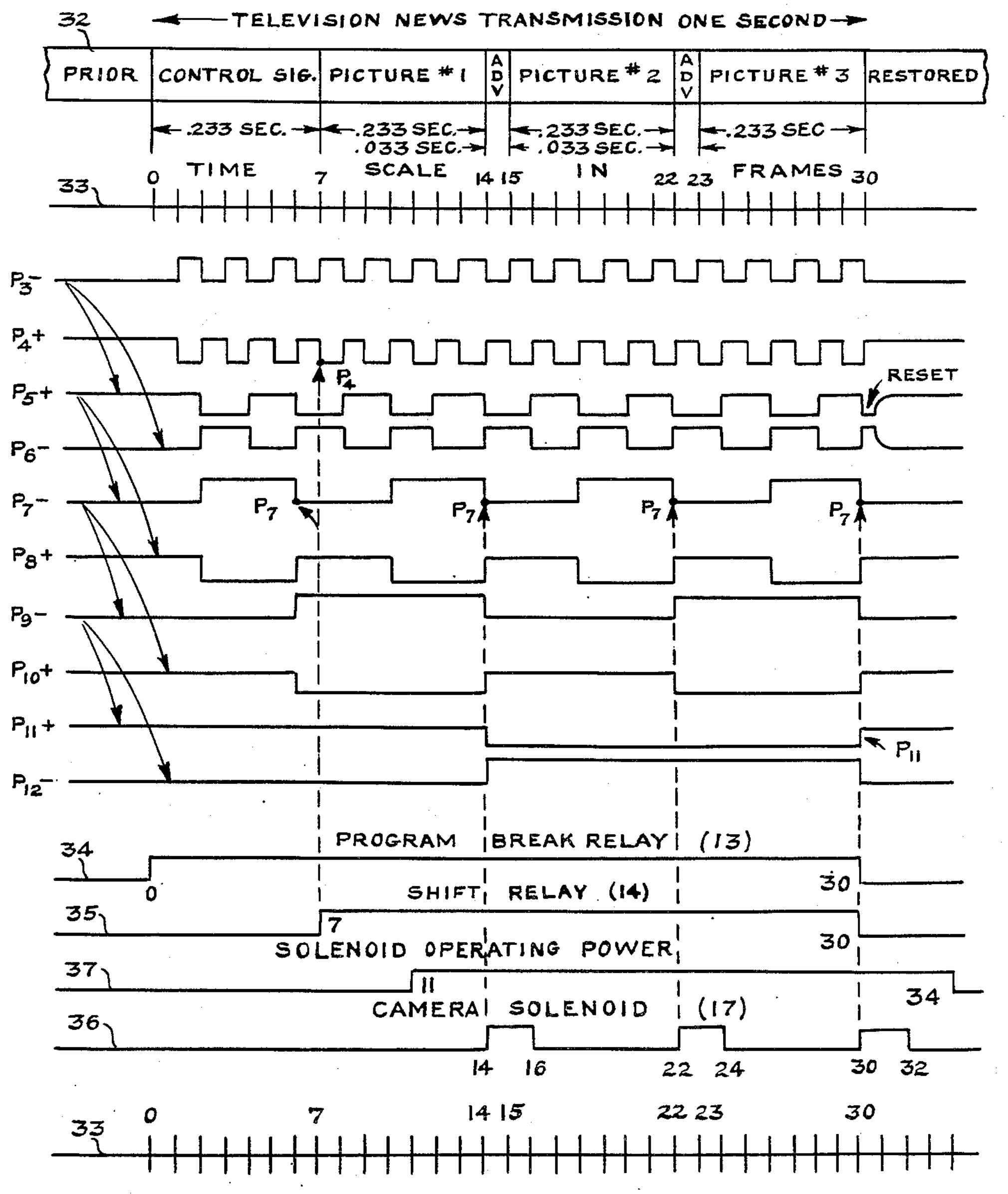
Fig. 3 is a diagram showing the timing relationships of various elements of Figs. 1 and 2.

Fig. 3 gives an illustrative example of the timing operation of the system, with three pictures transmitted in a one second interval. Thus, with reference to the top chart of the figure designated 32, a .233 second is the nominal time for the control signal and each picture, corresponding to the duration of seven standard TV frames, and .033 second corresponding to one TV frame is allowed for replacing the first picture by the second and the second by the third, by operation of the advancing mechanism. It will be understood that these timing indications are ideal, and neglect the small amounts of time required for relay operation and transfer, which may be of the order of .001 second.

It is convenient to use the duration of a TV frame as a unit of time, as indicated by chart 33. On this basis, as seen by traces 34, 35, 36, the program break relay 13 is energized between the counts of zero and 30; the shift relay 14 is energized between the counts of 7 and 30; the camera solenoid 17 is energized between the counts of 14 and 16, 22 and 24 and 30 to 32, the latter to eject the third picture. Trace 37 further shows the operation of a delay relay of Fig. 2 which closes and opens shortly after the closing and opening of relay 14, for the purpose of providing the energizing power for the solenoid 17 for the time period 30 to 32, and for preventing the solenoid 17 from operating in a time period 7 to 9.

Figure 2:
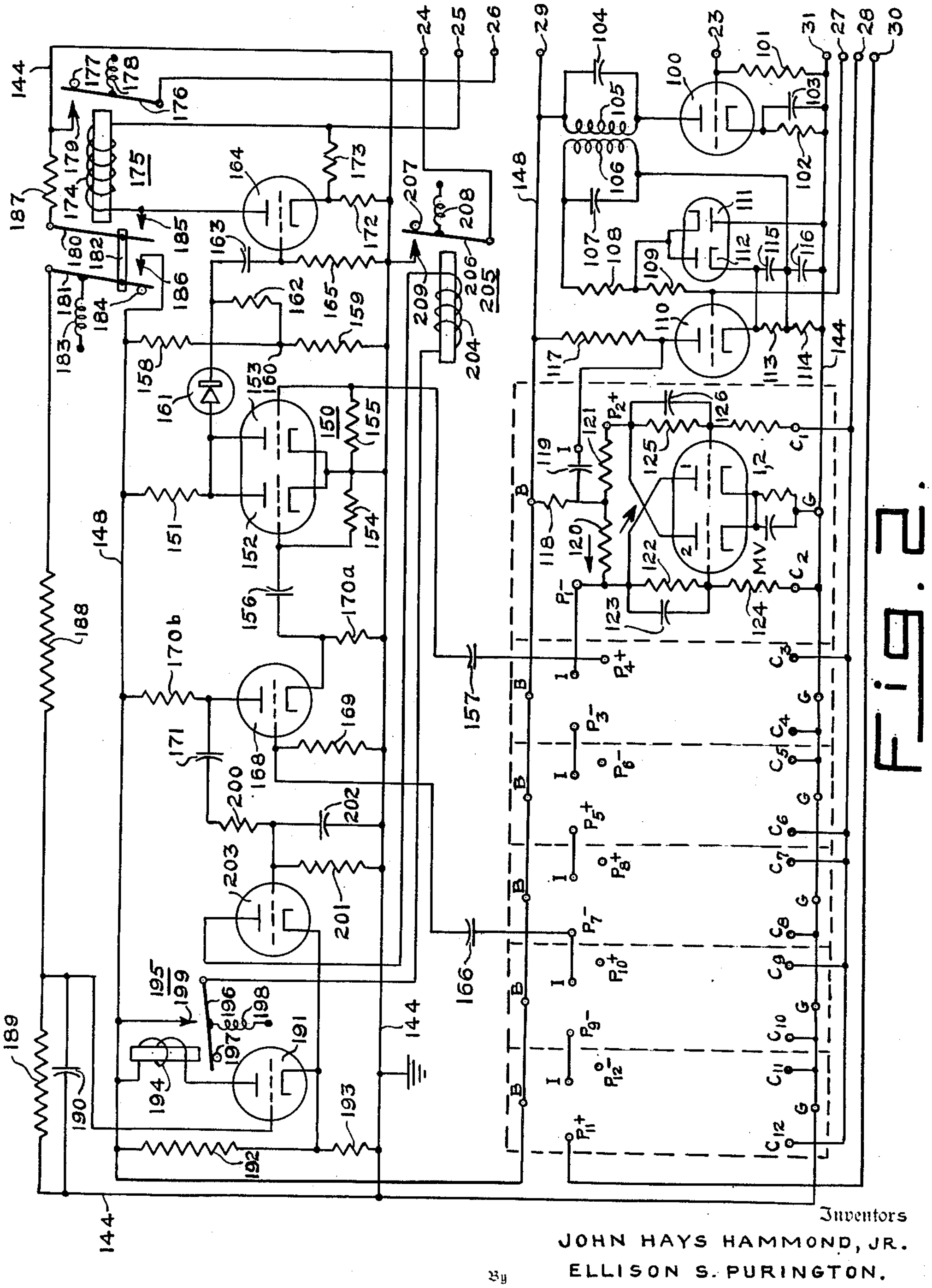
Fig. 2 is a schematic diagram of a timing circuit shown in block in Fig. 1.

In the present form, the timer of Fig. 2 is of the binary counter type, driven from a train of pulses derived from the vertical sweep frequency of the TV system and delivered to the counter when the primary relay 21 is closed. The pulse train is discontinued and the counter reset when the relay 21 is deenergized upon delivery of a positive pulse from the counter to the terminal 30. The counter also delivers pulses which individually or in combination provide for the functioning of the shift relay 14 and the advancing solenoid 17.

A more detailed description follows.

With reference now to Fig. 1, the electronic toggle circuit 20 involves six triodes which may in some instances be individual triodes of commercial duo-triode tubes. Thus triodes 38, 39 constitute the main toggle; triodes 40 and 41 are electronic couplers which drive the toggle in response to positive pulses on the grids of the couplers; triode 42 serves to produce a starting pulse of short duration regardless of the amount of time that the button 19 is depressed; triode 43 serves to energize relay 21 after tube 40 is pulsed positively, and to deenergize the relay after tube 41 is pulsed positively.

More specifically, one terminal of the push button 19 is connected to ground line 44 which is connected to timer terminal 31. The cathode of triode 42 is connected through resistor 45 to the grid of triode 42, and to the other terminal of the button 19; the cathode of triode 42 is also connected through resistor 46 to ground line 44, and through resistor 47 to the high voltage line 48 which is connected to timer terminal 29 and to the positive end of a plate battery 49 or its equivalent, the negative end of which is connected to ground line 44. The anode of triode 42 is connected through resistor 50 to the line 48, and to one end of a pulsing capacitor 51, the other end of which is connected to ground through resistor 52 and also through resistor 53 to the grid of coupler triode 40. At the other end of the toggle, the timer terminal 30 is connected through capacitor 54 to the grid of coupler triode 41, which grid in turn is connected to ground line 44 by resistor 55. The cathodes of coupler triodes 40 and 41 are positively biased by batteries 56, 57 respectively, or equivalents, so that normally they do not pass current, but do so during the instants of time when their grids are positively pulsed.

The anode of coupler triode 40 is connected in parallel with the anode of toggle triode 39, and both are connected through resistor 58 to line 48, and through resistor 59 to the grid of triode 38, which in turn is connected to ground line 44 through resistor 60. Similarly the anodes of coupler 41 and toggle triode 38 are connected in parallel, and through resistor 61 to line 48, also through resistor 62 to the grid of toggle triode 39, which in turn is connected to ground line 44 through resistor 63. The cathodes of toggle triodes 38 and 39 are connected together and to the positive end of cathode bias battery 64 or equivalent, the negative end of which is connected to ground line 44.

The grid of toggle triode 39 is also connected to the grid of the relay tube triode 43, the cathode of which is positively biased with respect to ground by battery 65, and the anode of which is connected through winding 66 of primary relay 21 to the high voltage line 48.

Normally, as indicated, the grid of triode 42 is at cathode potential, so that a large current passes through the plate resistor 50. When the button 19 is pressed, the grid is connected to ground, while the cathode is connected to ground through resistors 45 and 46 in parallel. The constants are such that the cathode is positively biased with respect to the grounded grid, due to the current from battery 49 flowing through resistor 47, thence to ground by resistors 45 and 46. This positive bias may be such that little or no space current flows. Therefore when button 19 is pushed, the potential of the anode of triode 42 becomes more positive, whereby a positive pulse is impressed through capacitor 51 onto the grid of coupler tube 40. The constants are such that the pulse is of sufficient strength and duration to cause operation of the toggle when originally set as indicated with triode 38 conducting. After the termination of this pulse, the release of the push button 19 will cause a negative pulse to the grid of triode 40, but this in such a sense that the triode 40 which is already non-conducting will not affect the toggle operation.

During the positive pulse on the grid of triode 40, current flows through resistor 58 to the anode of triode 40, thereby depressing the plate potential, and in turn depressing the grid potential of triode 38. This cuts off the plate current normally flowing as indicated through resistor 61 to the anode of triode 38, thereby increasing the potential of the anode of the triode 38 and also the grid of triode 39, causing current to flow through resistor 58 to the anode of triode 39. Thus the toggle has been thrown to the opposite stable position which is maintained after triode 40 ceases to conduct due to the ending of the starting pulse. In this condition the grid of triode 43 is maintained positive, and the constants are such that space current flows, the winding 66 of primary relay 21 is energized and the relay actuated. Thus closure of the relay 66 results almost instantaneously on closure of the button 19; the relay 21 cannot be released by release of the button 19, but will be released only due to a positive pulse on the grid of triode 41, due to an increase of potential of terminal 30.

One armature 67 of the relay 21 is connected to high voltage line 48, and normally is held to back stop 68 by a spring 69. Front contact 70 is connected to one end of the winding 71 of relay 13, the other end of which is connected to ground line 44. The front contact 70 is also connected to one end of the winding 72 of relay 14, the other end of which is connected to timer terminal 26. The front contact 70 is also connected to timer terminal 25 which therefore is at high voltage potential during the closure of relay 21. It is readily apparent that the program break relay 13 is energized immediately on closure of primary relay 21; that shift relay 14 is energized when terminal 26 is connected to ground terminal 31 within the timer; that both relays 13 and 14 will be deenergized when the primary relay 21 opens.

The other armature 73 of relay 21 is connected to ground line 44 and therefore to timer terminal 31. This armature normally is held by means of a spring 75 to a back contact 74 connected to timer terminal 27. The front contact 76 is connected through a resistor 77 to the high voltage line 48, and through a resistor 78 to the ground line 44. It is also connected to timer terminal 28. The functioning of this end of relay 21 will be considered in connection with the operation of the timer.

The control signal generator 15 and the TV camera 16 are provided with suitable terminals 79 to 86, connected to horizontal and vertical sweep signal sources with all even numbered terminals connected to ground. The "hot" terminals 79 and 83 are connected to the "hot" horizontal sweep signal source; the "hot" terminals 81, 84 as well as the timer terminal 23 are connected to the "hot" vertical sweep signal source. The TV program source 10 also is provided with sweep signals, not shown. Video signals are made available at the output terminal 87 of source 10, TV news signals are available at output terminal 88; control signals capable of making a stationary pattern on a receiver scope are available at terminal 89. All these video signals are therefore properly sweep synchronized with respect to the receiver sweeps provided by the synchronizing signals injected into the transmitter system subsequent to the circuits here shown.

The TV news camera solenoid winding is connected to terminal 90 which is connected to timer terminal 24, and to terminal 91 which is connected to line 48.

Armature 92 of relay 13 is normally held by a spring 93 to a back contact 94 connected to TV program source output terminal 87, while the front contact 95 is connected to armature 96 of relay 14 normally held by a spring 97 to the back contact 98 connected to the control signal generator output terminal 89 while the front contact 99 is connected to the TV news camera output terminal 88.

It is clear that the connections are such that upon closure of push button 19; relay 13 closes to break the normal program and first substitute the control signal from generator 15; that when timer terminal 26 is grounded within the timer, the relay 14 closes to substitute the output of the TV news camera; that when timer terminal 24 is grounded for a short time at suitable intervals within the timer, the advancer solenoid will be operated and released to change the transmitted still picture; that in respanse to a sharp increase of potential on timer terminal 30 to reset the toggle, the program break relay will be released to restore the program from source 87, and reset the shift relay 14.

Turning now to Fig. 2, one form of timer circuit is shown, with terminals 23 to 30 inclusive corresponding to terminals of the timer block of Fig. 1. The ground line connected to terminal 31 is designated 144, and the high voltage line connected to terminal 29 is designated 148.

The vertical sweep terminal 23 is connected to the grid of a triode 100, and through resistor 101 to ground line 144. The triode 100 is biased for class A operation by cathode resistor 102 and capacitor 103. The anode is connected through capacitor 104 and inductor 105 tuned to the fundamental vertical sweep frequency of 60 cycles. This circuit 104, 105 is the primary of a coupled circuit system, and is suitably coupled to a secondary comprising inductor 106 and capacitor 107 to drive a square wave generator. One end of this inductor and capacitor are connected together and through resistors 108 and 109 to the grid of a counterdriver triode 110, and to the timer terminal 27. For producing a square wave, the junction of resistors 108 and 109 is connected to the cathode and to the anode, respectively, of a pair of clipping diodes 111 and 112. The anode of diode 111 is connected to ground line 144, the cathode of diode 112 is connected to the cathode of triode 110 and to ground through resistors 113, 114 in series, shunted by capacitors 115 and 116. The other ends of inductor 106 and capacitor 107 are connected together and to the junctions of capacitors 115 and 116 and of resistors 113 and 114. The anode of triode 110 is connected through plate coupling resistor 117 to the high voltage line. The circuits are so arranged that the space current through triode 110 biases the anode of diode 112 positive and the anode of diode 111 negative with respect to the grid return point at the junction of resistors 113 and 114. As a result, the diodes draw current to limit the grid swing (assuming the relay 21 of Fig. 1 is closed), and produce sharp sided trapezoidal wave form from the sinusoidal wave form developed by the tuned circuit. This wave form is repeated into the plate circuit across the resistor 117. The square wave train for driving the counter is terminated upon release of relay 21 of Fig. 1 due to a positive pulse developed on terminal 30.

The counter for establishing pulses for controlling the relays 13, 14 and solenoid 17 of Fig. 1 is of the binary type. Such counters are described, for example, by Grosdoff, RCA Review, September 1946, page 438, and only one section is shown in detail. This is the section MV–1, 2 with input terminal I, anode terminals $P_1-$ and $P_2+$ plate supply terminal B, ground terminal G, and grid return terminals $C_1$ and $C_2$. In the normal condition shown, the triode 1 passes current due to its grid return terminal $C_1$ being positively biased by terminal 28 connected to the junction of resistors 77 and 78 of Fig. 1 bridged between high voltage line and ground. Upon closure of the relay 21, the terminal 28 is grounded to permit the counter to be operated by the pulse train operatively connected to the counter due to the breaking of the connection of armature 73 to back contact 74.

In this form of counter the B terminal on the high voltage line 148 is connected through resistor 118 to one end of the coupling capacitor 119 which is connected through resistors 120 and 121 to the terminals $P_1-$ and $P_2+$ connected to the anodes of the first and second triodes of the "multivibrator" MV–1, 2. The other end of capacitor 119 is connected to the input terminal I and thereby to the anode of the driver tube 110. The designation $-$ for $P_1$ and $+$ for $P_2$ indicates the initial potentials of these anodes at the start of the count. Terminal $P_1$ is connected through resistor 122 shunted by capacitor 123 to the grid of the second triode which in turn is connected through resistor 124 to terminal $C_2$ which for MV–1, 2 is connected to ground. Similarly terminal $P_2$ is connected through resistor 125 shunted by capacitor 126 to the grid of the first triode which in turn is connected through resistor 127 to terminal $C_1$ which for MV–1, 2 is connected to the reset terminal 28.

The other five decade counters MV–3, 4 to MV–11, 12 inclusive are identical in construction with that shown for MV–1, 2; but the connections from the grid return terminals may be different. Thus $C_4$, $C_5$, $C_8$, $C_{10}$, $C_{11}$ are connected to ground and $C_3$, $C_6$, $C_7$, $C_9$, $C_{12}$ are connected to the reset terminal 28 thereby making $P_4$, $P_5$, $P_8$, $P_{10}$, $P_{11}$ initially positive and $P_3$, $P_6$, $P_7$, $P_9$, $P_{12}$ initially negative.

When the relay 21 of Fig. 1 is closed the grid of 110 is ungrounded to start the pulse train through tube 110, and the reset terminal 27 is grounded so that the pulse train can operate the counter. As is well known, each counter changes condition only on the application of a negative pulse at its input terminal I. The first negative pulse through capacitor 119 will stop the flow of current through the first tube, making $P_1$ positive, and the second negative pulse will restore the current through the first tube, making $P_1$ negative. Thus with MV–1, 2 driven by a square wave of 60 cycles fundamental, with 60 negative applied pulses per second, the next counter MV–3, 4 will receive 30 negative pulses per second, and will operate 30 times per second with fifteen shifts in one direction and fifteen in the other.

The timing diagram of Fig. 3 shows the wave forms developed at the various anodes $P_3$ to $P_{12}$ of the five counters shown in block, assuming the counter MV–3, 4 first operates at just before the end of the first $\frac{1}{30}$ second after operation of relays 21 and 13. While the five binary counters could be arranged to to cause operation of the last counter at the counter of 32, the shift of the reset connection for MV–5, 6 results in advancing the phase of operation of MV–11, 12 so that it delivers a negative pulse from $P_{11}$ at the count of 14 and a positive pulse at the count of 30. The terminal $P_{11}$ is connected to timer terminal 30, which in Fig. 1 is connected through capacitor 54 to the grid of toggle coupler triode 41. The negative pulse at the count of 14 does not operate the toggle, since it does not cause triode 41 to conduct. But the positive pulse at the count of 30 resets the toggle and releases the relay 21, terminating the counter operations, since the pulse due to the push button 19 has long since been dissipated.

Release of relay 21 grounds terminal 27 to stop the delivery of pulses to the counter. It also causes the reset terminal 28 to become positive to reset the counter to its initial condition, which will not be changed upon later closure of relay 21 until the delivery of the first negative pulse.

In addition to the connection to $P_1$ for ending the count when it is first pulsed positively connections are made also to terminals $P_4$ to deliver negative pulses at the count of 1, 3, 4, 7, etc. and terminal $P_7$ to deliver negative pulses at the counts of 6, 14, 22, 30. These are for use in controlling the operation of the relay 14 and the solenoid 17 of Fig. 1 in a manner shortly to be described.

It will be understood there is no relationship between the instant of pushing the button 19 and the phase of the voltage delivered by the tuned circuit 106, 107. Therefore there may be an uncertainty of the order of 1/60 second in the time of the first positive pulse on $P_3$. The uncertainty can be made as small as desired by driving the counter not at 60 cycles but from a harmonic of the vertical sweep frequency such as 120, or 240 cycles. This procedure, however, would require added counters between the driver tube and the counter stages here shown. The possible error with the present arrangement will not be serious, since the duration of the picture transmission provides more than ample time for recording at the receiver.

For operating the shift relay 14 of Fig. 1, to terminate the control signal at the count of 7, use is made of the first negative pulse at the count of 7 from $P_4$ after the first negative pulse from $P_7$ at the count of 6, as indicated in Fig. 3. For this purpose, a coincidence circuit is provided using duo-triode 150 made up of triodes 151 and 152, with cathodes in parallel and connected to ground line 144, with anodes in parallel and connected through plate resistor 151 to high voltage line 148, with grids of 152 and 153 connected to ground line 144 through resistors 154 and 155 respectively, and also connected to one end of blocking capacitors 156 and 157 to be pulsed negatively from counter anodes $P_7$ and $P_4$ respectively. For the output circuit of the duo-triodes 150, a potential divider comprising resistors 158 and 159 is bridged across from line 148 to line 144, to establish a potential at their junction point 160 which is higher than the potential of the plates of the duo-triode 150 when either of the grids is biased negatively beyond cutoff, but lower than the potential when both of the grids are biased negatively beyond cutoff. The anode plates of tube 150 are connected to the anode of a unidirectional conductor 161 such as an electronic diode rectifier or a crystal detector, the cathode of which is connected through resistor 162 to the junction point 160, and is also connected through capacitor 163 to the grid of a relay triode 164, which grid in turn is connected through resistor 165 to ground line 144. It is clear than conductive current will be delivered through device 161 and resistor 163 to establish a positive pulse in the grid of triode 164 only during those portions of time when both the grids of duo-triode 150 are negative.

The other end of capacitor 157 is connected to terminal $P_4$ of the counter. One end of a capacitor 166 is connected to the terminal $P_7$ of the counter, and the other end is connected to the grid of a triode 168, which in turn is connected through resistor 169 to ground line 144. The cathode of triode 168 is connected to ground line 44 by resistor 170*a* and to the free input end of capacitor 156. The anode of triode 168 is connected through plate resistor 170*b* to line 148, and also is connected to one end of a capacitor 171. The triode 168 serves as a cathode follower tube to deliver pulses developed across output resistor 170*a* to the grid 152 of the coincidence circuit, in phase with the pulses impressed on the capacitor 166. It also serves to deliver oppositely phased pulses developed across output resistor 170*b* to the capacitor 171 for uses not now under consideration. The time constants of the circuits described are such that the wave form impressed on the grids 152 and 153 is sufficiently the same as those developed at $P_7$ and $P_4$ respectively. Therefore due to changes of potentials of $P_7$ and $P_4$, the grids of the coincidence circuit 150 are both negative for the first time between the counts of 7 and 8. It should be noted that although $P_7$ and $P_4$ are both negative between the counts of 1 and 2, nevertheless the grid of triode 152 is not negative since the capacitor 166 has not been pulsed, and both ends are at a fixed potential.

As a result, the grid of triode 164 is pulsed positively first between counts of 7 and 8, and this pulse is used to operate relay 14 of Fig. 1. For this purpose, the cathode of triode 164 is connected through resistor 172 to ground line 144, and through resistor 173 to terminal 25 which is at high voltage only during the interval 0 to 30 while relay 21 is closed. The terminal 25 is also connected through the winding 174 of a relay 175 to the anode of triode 164. The constants are such that current flows through the relay winding to the anode of 164 during the period when the grid is positively pulsed from the coincidence duotriode 150. The relay 175 has an armature 176 connected to terminal 26 and therefore, Fig. 1, to that end of the winding 72 of shift relay 14 which is not the end connected by relay 21 to the high voltage line 48. The armature 176 is normally held against a back stop 177 by a spring 178, and is brought in contact with a front contact 179, connected to ground line 144. The armature 176 and associated contacts therefore provide for grounding the terminal 26 at the count of 7. A second armature 180 is used to keep the relay closed after the pulse on the grid of triode 164 has passed. This is a part of a two leaf assembly involving also armature leaf 181 connected to the armature 180 by an insulated coupling 182. These armatures are held normally open by a spring 183 which holds leaf 181 against back stop 184. Front contacts 185 and 186 are provided for the armatures 180 and 181. For the present we are concerned only with the functioning of armature 180, which is connected through a resistor 187 to ground line 144 and its front contact 185 which is connected to the anode of triode 164. When the relay 175 is closed by current to the anode of triode 164, current also flows through the winding 174 to ground through contact 185, armature 180 and resistor 187. The constants are such that this current will hold the relay 175 closed after the initiating pulse has ceased. It will remain closed, until relay 21 opens at the count of 30 to disconnect terminal 26 from the high voltage source. In this manner, the relay 14 is made to close at the count of 7 and to be restored to the normal at the count of 30.

For controlling the operations of the camera advancing solenoid 17, use is made of the negative pulses from $P_7$ of the counter at the counts of 14, 22 and 30. It is necessary, however, to provide that the solenoid shall not operate at the count of 6, since the first picture is already in position, and to provide that the solenoid is powerized for a brief period after the count of 30. This is accomplished by the use of a delay system whereby the solenoid circuit is powerized as indicated in Fig. 3, trace 37. For this purpose contact 186 of relay 175 is connected to the high voltage line 148, the armature 181 is connected through a resistor 188 in series with a resistor 189 shunted by a capacitor 190, to the ground line 144. The junction of resistors 188 and 189 is connected to the grid of a relay tube triode 191, the cathode of which is connected through resistor 192 to the line 198 and through resistor 193 to the ground line 144, and the anode of which is connected through winding 194 of a relay 195 to the line 148. This relay has an armature 196 normally held against a back stop 197 by a spring 198, and has a front contact 199 connected to the high voltage line 148. The constants are such that the tube 191 normally passes little or no current. When however relay 175 is closed at the count of 7, the voltage across delay capacitor 190 and the shunting resistor 189 builds up and after a suitable time of the order of four counts, the anode current of tube 191 is sufficient to cause closure of relay 195. This relay is held closed until after the opening of relay 175 at the count of 30 initiates the discharge of capacitor 190, and continues to remain closed until the anode current drops to the fall out value for the relay. In this manner high voltage circuits controlling the camera solenoid operation can be made available from the count of 11 to the count of 34, for example.

The pulses from counter terminal $P_7$ reversed by action of tube 168 are delivered to the capacitor 171, one side of which as has been described is connected to the anode of tube 168. The other side of capacitor 171 is connected through resistors 200 and 201 to ground line 144, the resistor 201 being shunted by capacitor 202. The junction of resistors 200 and 201 is connected to the grid of a relay triode 203 the cathode of which is connected to the cathode of triode 191, and the anode of which is connected through winding 204 of a relay 205 to the armature 196 of relay 195. The constants are such that the relay 205 will not be closed when high voltage is supplied for triode 203 by the closure of relay 195, but will be closed in response to the pulse delivered through capacitor 166, at the count of 14 which by the choice of constants causes the grid of 203 to be positive for a sufficient time to hold relay 205 closed for the duration of about two counts. The time constant of the circuit is such that the grid circuit of the triode 203 will be restored substantially to zero voltage after the pulse from $P_7$ at the count of 10 which drives the grid of triode 203 negative, so that the tube 203 and relay 205 will again operate properly at the counts of 22, and 30. The relay 205 has an armature 206 normally held against a backstop 207 by a spring 208, and has a front contact 209 connected to ground line 144. The armature 206 is connected through timer terminal 24 and camera terminal 90 to one end of the winding of the solenoid 17, the other end of which winding is connected to the high voltage line 48. Consequently, the solenoid 17 is operated during the closure of relay 204. It will be understood that the camera advancing mechanism operates on the first stroke of the solenoid, and that the solenoid is restored by gravity or spring action in readiness for a later advancing operation after the relay 205 is opened.

In this manner, it is seen that there is provided a high speed timer system which, upon pushing button 19, causes the transmission from source 10 to be broken for a period of one second, during which a control signal is sent from generator 15, followed by the video output from camera 16 corresponding to a sequence of three still pictures. At the end of this break period, the circuits of the system are all automatically restored so that the system is in condition for another cyclic operation.

In Fig. 1, the TV source 10 is sufficiently well known and needs no detailed description; an example of the timer 22 has been shown in Fig. 2. An example of the Control Signal Generator is given in Fig. 4, and the mechanism for advancing a film in the TV news camera 16 is given in Fig. 5.

Figure 4:
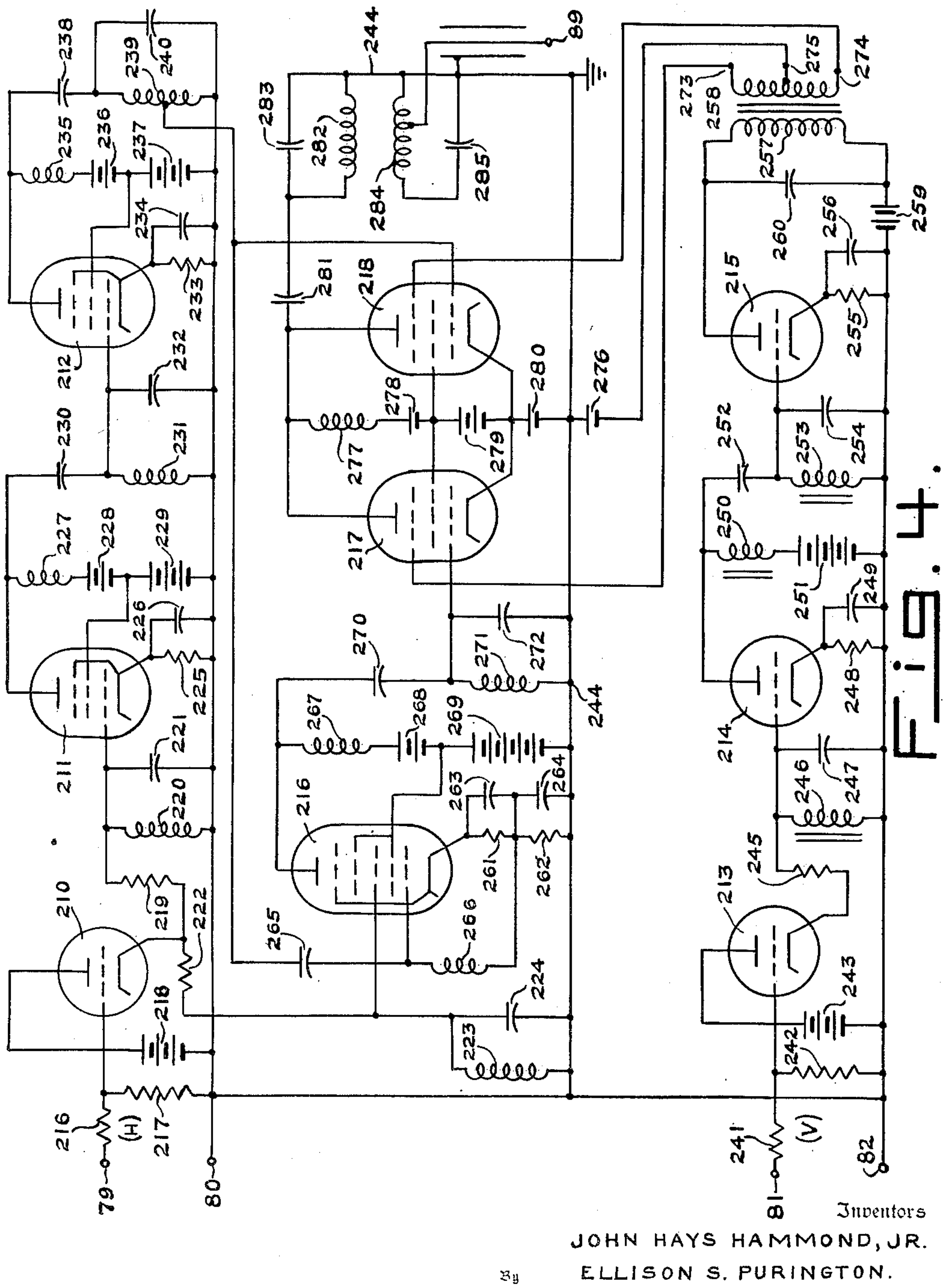
Fig. 4 is a schematic diagram of a form of control signal generator for use in Fig. 1.

In Fig. 4, the horizontal sweep terminals are 79 and 80, the vertical sweep terminals are 81 and 82 and the output terminal is 89, corresponding to similar terminals of Fig. 1. The terminals 80 and 82 are connected to a ground line 244, externally connected to ground lines 44 and 144 of Figs. 1 and 2. At the top of the figure is a three tube circuit using triode 210 and pentodes 211 and 212 for producing the eighth harmonic of the horizontal sweep frequency. At the bottom is a three tube circuit using triodes 213, 214, 215 to produce the eighth harmonic of the vertical sweep frequency. In the middle is a three tube circuit; "heptode mixer" 216 is driven both at the fundamental and eighth harmonic of the horizontal sweep frequency, to produce the ninth harmonic; the two pentodes 217 and 218 are driven from the ninth and eighth harmonic respectively of the horizontal frequency but are push pull modulated by the eighth harmonic of the vertical sweep frequency so that the output energy for terminal 89 switches cyclically between the eighth and ninth harmonics of the horizontal sweep frequency at a modulation frequency rate equal to the eighth harmonic of the vertical sweep frequency. The output when applied to the grid of a kinescope with the same sweep frequencies as used in producing this output, will produce a stationary video pattern which can serve to check the proper performance of the control signal generator.

More specifically, the "hot" horizontal sweep frequency terminal 79 is connected through resistor 216 to the grid of triode 210, which grid is connected through resistor 217 to ground line 244. The anode of triode 210 is connected to the positive end of battery 218, the negative end of which is connected to ground line 244. The cathode of triode 210 is connected through resistor 219 to the grid of pentode 211, between which and ground line 244 is connected an inductor 220 and a capacitor 221, resonant at twice the horizontal frequency. The cathode is also connected through resistor 222 to the third grid of the heptode 216, between which and ground line 244 is connected an inductor 223 and a capacitor 224 in parallel, tuned to the horizontal sweep frequency. The cathode of pentode 211 is connected to ground line 244 through resistor 225 shunted by capacitor 226; the anode is connected through choke 227 to the positive end of battery 228, the negative end of which is connected to the screen of pentode 211 and to the positive end of battery 229, the negative end of which is connected to ground line 244. The anode of pentode 211 is also connected through blocking capacitor 230 to the grid of pentode 212, between which and ground is connected an inductor 231 and a capacitor 232 tuned to four times the horizontal sweep frequency. The cathode of pentode 212 is connected through resistor 233 shunted by capacitor 234, to ground line 244. The anode of pentode 212 is connected through choke inductor 235 to the positive end of battery 236, the negative end of which is connected to the screen of pentode 212 and to the positive end of battery 237, the negative end of which is connected to ground line 244. The anode of pentode 212 is also connected through capacitor 238 and a tapped inductor 239 shunted by capacitor 240 to ground line 244. Inductor 239 and capacitor 240 are tuned to eight times the horizontal sweep frequency. In operation, triode 210 operates as an isolating triode delivering second harmonic energy present in the input wave form to pentode 211, as well as fundamental energy to heptode 216. Pentodes 211 and 212 operate as frequency doublers to produce fourth harmonic energy in the coupling circuit between these pentodes, and eighth harmonic energy in the tuned circuit 239, 240.

The "hot" vertical sweep frequency terminal 81 is connected through resistor 241 to the grid of triode 213, which in turn is connected through resistor 242 to the ground line 244. The anode of triode 213 is connected to the positive end of battery 243, the negative end of which is connected to ground line 244. The cathode of triode 213 is connected through resistor 245 to the grid of triode 214, between which and ground line 244 is connected an inductor 246 in parallel with a capacitor 247, tuned to twice the vertical sweep frequency. The cathode of triode 214 is connected to ground through resistor 248 shunted by capacitor 249. The anode of triode 214 is connected through a choke inductor 250 to the positive end of a battery 251, the negative end of which is connected to the ground line 244. The anode of triode 214 is also connected through capacitor 252 to the grid of triode 215, between which and ground is connected an inductor 253 paralleled by capacitor 254 and tuned thereby to four times the vertical sweep frequency. The cathode of triode 215 is connected to ground through resistor 255 shunted by capacitor 256. The anode of triode 215 is connected through the primary 257 of a transformer 258 to the positive end of a battery 259, the negative end of which is connected to ground line 244. The primary 257 of the transformer is resonated to eight times the vertical sweep frequency by shunting capacitor 260. In operation, triode 213, operates as an isolating repeater to deliver second harmonic energy present in the input to triode 214 which together with triode 215 operates as a frequency doubler. Thus fourth harmonic energy is developed in the circuits coupling triode 214 to triode 215, and eighth harmonic energy is developed in the output circuit 257, 260 of triode 215.

The heptode 216 has its second and fourth grids connected together to form a screen, and its fifth or suppressor grid connected to the cathode. The cathode is connected to ground line 244 through resistors 261 and 262 in series, paralleled by capacitors 263 and 264. As previously indicated, the third grid is connected to the junction of resistor 222 with the inductor 223 and capacitor 224 and is excited at the fundamental of the horizontal sweep frequency. The first grid is connected through capacitor 265 to the tap on inductor 239, and is connected through choke inductor 266 to the junctions of resistors 261 and 262. Therefore the first grid is excited by the eighth harmonic of the horizontal sweep frequency. The anode is connected through the choke inductor 267 to the positive end of battery 268, the negative end of which is connected to the second and fourth grids and to the positive end of battery 269, the negative end of which is connected to ground line 244. The anode is also connected through capacitor 270 to the first grid of pentode 217, which is connected to ground through inductor 271 paralleled by capacitor 272 by which it is tuned to the ninth harmonic of the horizontal sweep frequency. The heptode 216 thus operates as a "mixer" or converter, driven by the fundamental and eighth harmonic of the horizontal sweep frequency to yield a ninth harmonic component used to drive the pentode 217.

The first grid of pentode 218 is connected to the tap on inductor 239, so that of the two pentodes 217 and 218, one is driven by the eighth and the other by the ninth harmonic. The secondary of transformer 258 has one outer terminal 273 connected to the third grid of pentode 217 and the other outer terminal 274 connected to the third grid of pentode 218, while the center tap 275 is connected to the negative end of a battery 276, the positive end of which is connected to the ground line 244. The anodes of the pentodes 217 and 218 are connected together and through a choke inductor 277 to the positive end of a battery 278 the negative end of which is connected to the second or screen grids of the pentodes 217 and 218 and to the positive end of a battery 279, the negative end of which is connected to the cathodes of the pentodes 217 and 218 and to the positive end of a battery 280, the negative end of which is connected to ground line 244. The anodes of the pentodes 217 and 218 are also connected through capacitor 281 and inductor 282 paralleled by capacitor 283 to ground line 244. Inductively coupled to the inductor 282 is a secondary inductor 284 with one end connected to ground line 244, and the other end connected to ground line 244 through a capacitor 285. A tap on the secondary inductor 284 is connected to the control signal generator output terminal 89. The output circuit of the pentodes 217, 218 is so arranged as to be responsive both in the vicinity of the eighth and of the ninth harmonic of the horizontal sweep frequency. The connections and the operations of the push pull transformer driven by triode 215 are such that the pentode 217 operates efficiently as an amplifier and the pentode 218 is inoperative during one half of the transformer cycle, while the other pentode 218 operates efficiently as an amplifier and the pentode 217 is inoperative during the other half of the transformer cycle. As a result, the output circuit of the two pentodes 217 and 218 is alternatively driven at the eighth and the ninth harmonic of the horizontal sweep frequency, with the rate of shift corresponding to the eighth harmonic of the vertical sweep frequency. By suitable design, or modification such as by insertion of resistors in the leads to the third grids, the output can be made to correspond very closely to a signal which is square wave or key shift frequency modulated between terminal frequencies corresponding to the eighth and ninth harmonics of the horizontal sweep frequency, at a rate corresponding to the eighth harmonic of the vertical sweep frequency.

It will be understood that harmonics may be developed in other manners, and the modulations may be by other processes. The figure and the type of output show merely one method of producing a control signal generator with distinctive characteristics suitable for the purposes of the present invention.

Figure 5:
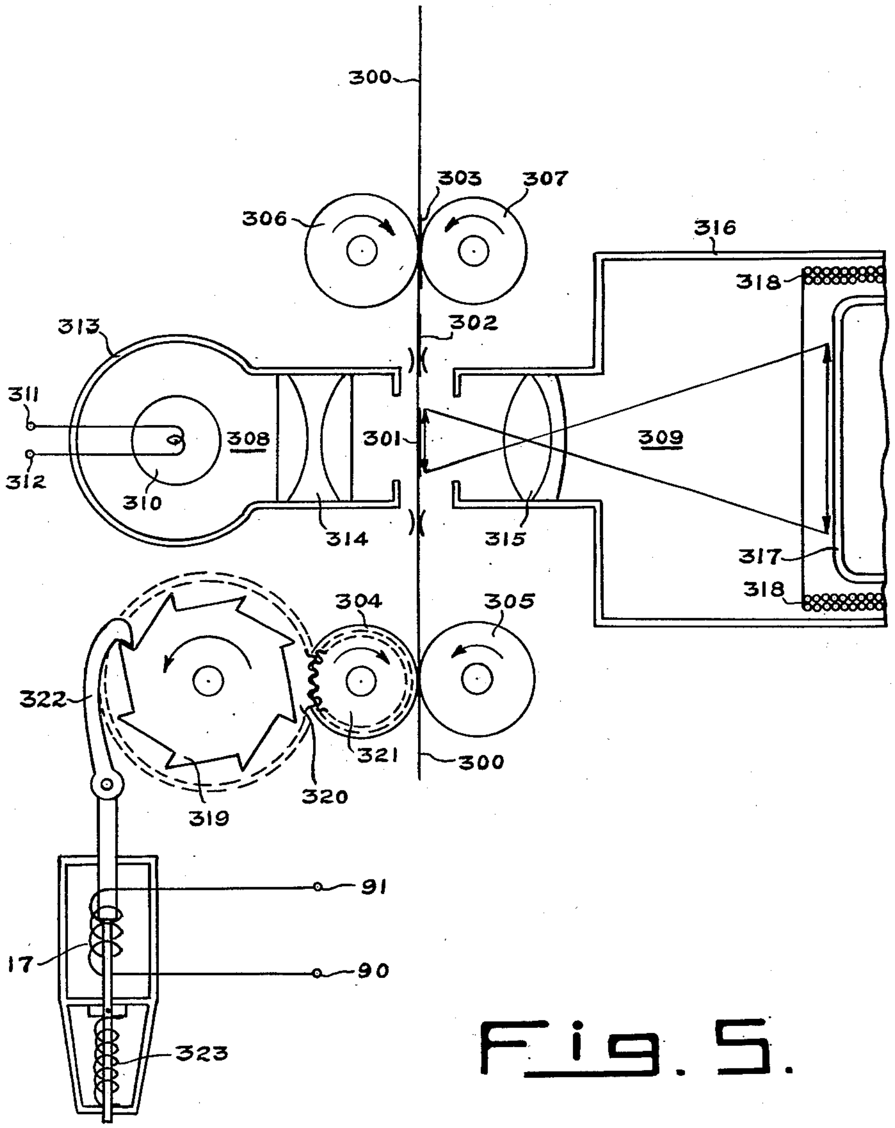
Fig. 5 is a diagrammatic view of the advancing mechanism of the TV news camera of Fig. 1.

In Fig. 5 is shown one form for the advancing mechanism of the TV news camera 16 of Fig. 1. This makes use of a solenoid 17 with electrical terminals 90 and 91 connected to the remainder of the system as shown in Fig. 1.

The material to be projected has been previously recorded on a moving picture type film 300, with recorded pictures 301, 302, 303 corresponding to the first, second and third still pictures of a set, respectively. This is set up in position between a pair of driving rollers 304, 305 and between a pair of rollers 306, 307 under tension by friction means not shown. The first picture 301 is registered with its center coinciding with the axis of an optical system including an illuminating system 308 and a projection system 309. The system 308 includes a lamp 310, with terminals 311 and 312 connected to a source of electrical power not shown, mounted in a housing 313, and furnishing substantially uniform illumination on the picture 301, making use of a condenser lens 314. The system 309 includes a projection lens 315 mounted in a casing 316. Also mounted in the casing 316 is television pick-up tube 317, such as an image orthicon described in Television, vol. IV, Jan. 1947, published by RCA Review, page 72. Other equipment including a focusing coil 318, and other electrical devices not shown provide for making up a video signal train suitably synchronized, at output terminal 88 of the TV news camera of Fig. 1, in accordance with the two dimensional picture pattern on the photo cathode. In the present instance, this is the picture 301 projected and focused upon the photo cathode by the optical systems 308 and 309.

For advancing the film, a ratchet wheel 319 is rotatably coaxially mounted on a gear 320, engaging a gear 321 on the driving roller 304. The roller in turn is geared to the film 300 by sprockets engaging sprocket holes, not shown. In the figures shown, the gears and the dimensions are such that the film will be advanced corresponding to the distance between centers of the pictures 301, 302, 303, when the ratchet wheel 319 is rotated an eighth of a revolution. The ratchet wheel 319 is driven by the solenoid 17 by a ratchet arm 322 upon excitation of the solenoid at terminals 90 and 91. When the solenoid is deenergized, the solenoid is restored by a spring 323. The ratchet disc 319 is provided with friction devices or detents not shown to prevent its turning backwards on the reset of the solenoid, and the ratchet arm 322 is provided with a spiral spring around its hinge, not shown, by which it reengages the ratchet wheel for again advancing the film at the next energization of the solenoid.

In operation, the film with the three recorded pictures is set up in position in the TV news camera of Fig. 1 as shown in Fig. 5, to provide TV news video signals at terminal 88. Subsequently, a signal is sent by use of lamp 18 indicating readiness for transmission. At a convenient time, the video director of the TV station pushes the button 19, for a period sufficiently long. Thereupon the flip-flop 20 closes relay 21, which in turn closes relay 13 and applies high voltage to timer terminal 25 and to one end of relay 14. Closure of relay 13 disconnects the normal program source 10 from the transmitter, and initially substitutes for it a control signal from the generator 15, shown in Fig. 4. Closure of relay 21 also ungrounds terminal 27 and grounds terminal 28 of the timer shown in Fig. 2, thereby starting a counter. At a proper instant the timer grounds the terminal 26 operating relay 14 to disconnect the transmitter from the control signal generator and connect it to the TV news camera. At later instants, the timer grounds and ungrounds terminal 24 two times in succession, to advance the film so that the three separate pictures are transmitted. Finally the timer produces a pulse at terminal 30 which releases the relays 21, and therefore restores relays 13 and 14 to the normal condition to provide renewal of transmission of normal program from source 10. At the same time, the relay 21 grounds terminal 27 to cut off the pulse train for the counter of timer 22, and ungrounds terminal 28, so that it acquires a positive potential to reset the counter system. In this manner, the system is restored, except that a third operation of the solenoid 17 provides for advancing the film to disengage it from the rollers 306, 307 of Fig. 5, to assist in its removal.

Although only a few of the various forms in which this invention may be embodied have been shown herein, it is to be understood that the invention is not limited to any specific construction but might be embodied in various forms without departing from the spirit of the invention or the scope of the appended claims.

What is claimed is:

1. A system for transmitting a series of still pictures for recording over a television channel during a timed break in a continuous television program, comprising a television transmitter responsive to television type signals, a source of television signals having means producing signals representing a continuous television program, a second source of television type signals having means producing a signal representing a predetermined control pattern, a third source of television signals having means producing signals representing repetitions of a still picture, a selector circuit having switching means selectively connecting said sources to energize said transmitter and normally connecting said first source to said transmitter, a plurality of still pictures to be scanned by said third source, stepping means to advance said still pictures for successive scanning, actuating means for said stepping means, a timer having means producing a plurality of pulses in a timed sequence, means initiating the operation of said timer and simultaneously actuating said switching means to disconnect said first source and connect said second source to said transmitter for transmitting signals representing said control pattern, means responsive to a first timed pulse from said timer to actuate said switching means to disconnect said second source and means responsive to said first timed pulse to connect said third source to said transmitter for transmitting signals representing said still pictures, means responsive to other timed pulses from said timer to cause operation of said actuating means for said stepping means to advance said still pictures for successive scanning, and means responsive to a final pulse from said timer said last named means having means to actuate said switching means to disconnect said third source and reconnect said first source to said transmitter and means to restore said timer to its initial condition.

2. A system as claimed in claim 1 in which said timer comprises an electronic counter circuit adapted to produce timed pulses at selected intervals corresponding to the successive scanning frames of said first source.

3. A system as claimed in claim 1 in which said timer is set for a complete cycle in a period of not over one second, and produces said timed pulses at periods representing multiples of the period of one scanning frame of said first source.

4. A system as claimed in claim 1 in which said timer comprises an electronic counter set to count intervals of $1/30$ second each and producing said set of timed pulses during a one second period.

5. A system as claimed in claim 1 in which said second source comprises modulator means operating at two different harmonics of the horizontal sweep frequency and modulated at a harmonic of the vertical sweep frequency to produce a signal which swings between said first harmonics.

6. A system as claimed in claim 1 in which said second source produces a signal representing a predetermined stationary pattern.

References Cited in the file of this patent

UNITED STATES PATENTS

| | | |
|---|---|---|
| 2,164,297 | Bedford | June 27, 1939 |
| 2,172,936 | Goldsmith | Sept. 12, 1939 |
| 2,193,869 | Goldsmith | Mar. 19, 1940 |
| 2,275,898 | Goldsmith | Mar. 10, 1942 |
| 2,420,029 | Brady | May 6, 1947 |
| 2,504,734 | Schmidling | Apr. 18, 1950 |
| 2,513,176 | Homrighous | June 27, 1950 |
| 2,613,263 | Hilburn | Oct. 7, 1952 |